United States Patent [19]

DeCore et al.

[11] 4,300,779
[45] Nov. 17, 1981

[54] WICKING-RESISTANT GASKET ASSEMBLY

[75] Inventors: Robert A. DeCore, Elk Grove Village; Anthony J. Bucher, Chicago, both of Ill.

[73] Assignee: Felt Products Mfg. Co., Skokie, Ill.

[21] Appl. No.: 157,425

[22] Filed: Jun. 9, 1980

[51] Int. Cl.³ .............................................. F16J 15/12
[52] U.S. Cl. ................................................ 277/235 B
[58] Field of Search ................... 277/235 B, 181, 166

[56] References Cited
U.S. PATENT DOCUMENTS

| 2,170,363 | 8/1939 | Balfe | 277/235 B |
| 3,560,007 | 2/1971 | Ascencio | 277/235 B |
| 3,635,480 | 1/1972 | Bain | 277/235 B |

Primary Examiner—Robert I. Smith
Attorney, Agent, or Firm—Dressler, Goldsmith, Shore, Sutker & Milnamow, Ltd.

[57] ABSTRACT

The construction and method of forming a wicking-resistant gasket assembly for an internal combustion engine is described. The gasket assembly includes a flat-elongated base, a layer of composite, porous gasket material on each face of the base, armor at the combustion chamber openings, and a peripheral bead of elastomeric material enveloping the edges of the gasket material sheets and the base to prevent the wicking of liquids from the gasket assembly layers outwardly through the periphery of the gasket assembly. The bead is applied to contact the free margin of the facing material and the peripheral edge of the base. The bead is preferably cured in place concurrently with the lamination and curing of the facing materials.

7 Claims, 5 Drawing Figures

WICKING-RESISTANT GASKET ASSEMBLY

TECHNICAL FIELD

This invention pertains to gaskets and gasket assemblies used to seal components of an internal combustion engine. In particular, this invention relates to a gasket assembly and to a method for producing a gasket assembly which resists the effects of fluid wicking through the gasket assembly when it is installed between an engine block and cylinder head of a marine engine.

BACKGROUND OF THE INVENTION

In spite of the fact that the top surface of an engine cylinder block and the lower surface of an engine cylinder head may be smooth to the eye, the two surfaces never fit together closely enough to prevent leakage. Therefore, a gasket must be inserted between them to effect a seal. Various head gasket designs have been used, and these include metal head gaskets, fibrous head gaskets, sandwich type head gaskets using a metallic core and asbestos-bonded layers laminated to the core, among others. Sandwich-type gasket assemblies have sufficient resiliency to seal the cylinder head and sufficient heat resistance, especially when armored, to withstand the high temperature and pressure of the combustion chamber.

Many gaskets are formed from asbestos-bonded layers and other materials which have some porosity, hence the capacity to wick under certain circumstances. These gaskets tend to permit the wicking of fluid, such as oil and water, laterally through the porous gasket layers towards the peripheral edge of the gasket assembly. Normally this is not a serious problem from the standpoint of engine servicing or operation. However, in marine engines, once-through cooling is frequently used and the water circulated through the engine is frequently sea water or brackish water. Consequently, if wicking is allowed to occur, the cooling water and the dissolved minerals seep to the outside of the gasket assembly where the water evaporates leaving behind unsightly deposits. Furthermore, if these deposits are allowed to build up, they can cause corrosion.

SUMMARY OF THE INVENTION

In accordance with the present invention, there is provided a gasket assembly which eliminates the effects of salt and mineral deposits building-up at the peripheral edge of a marine engine gasket assembly. The gasket assembly includes a metal gasket body having first and second generally planar surfaces defining at least one combustion opening, fluid-flow passageways and having armor around the combustion openings. A layer, such as a sheet of sealing material, is applied to each of the two planar surfaces to form a composite, laminated gasket assembly.

More specifically, the periphery of the gasket assembly is encapsulated with an impervious barrier or bead, preferably of an elastomeric material, to prevent the flow of liquids wicking through the composite facing layers from the zones of the fluid flow passageways outwardly through the peripheral margin of the gasket assembly as now occurs. Applying the bead to the peripheral edge of the gasket assembly not only seals the outside surfaces of the engine from the corrosive effects of salt and other minerals which deposit out from the fluid as it wicks through the facing layers, but also improves the overall appearance of the engine. This latter consideration is of special importance in the case of outboard motors where the external parts of the engine are exposed to view. Also, the gasket assembly is kept as thin as possible consistent with the applied forces holding the cylinder head on the engine block thereby preserving the torque retention properties of the gasket assembly. Thus, the gasket assembly is able to resist the effects of fluid wicking through the facing layers without an adverse effect on the torque retention properties of the gasket assembly.

Other advantages and features of the present invention will become readily apparent from the following detailed description of presently preferred embodiments of the invention, from the claims and from the accompanying drawings.

DETAILED DESCRIPTION OF THE ILLUSTRATIVE EMBODIMENT

Figure 1:
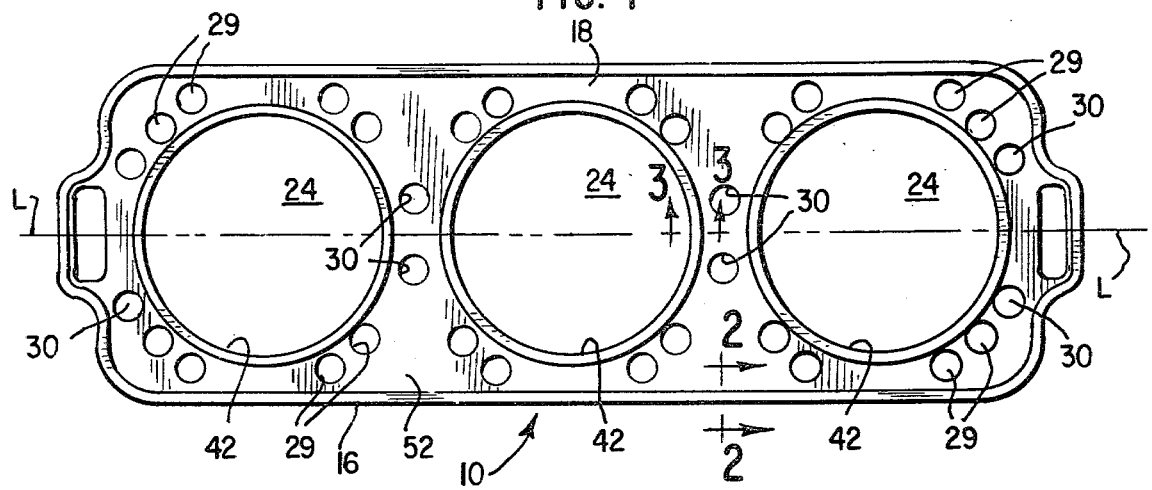
FIG. 1 is a top plan view of a wicking-resistant gasket assembly incorporating the principles of the present invention.
Figure 3:
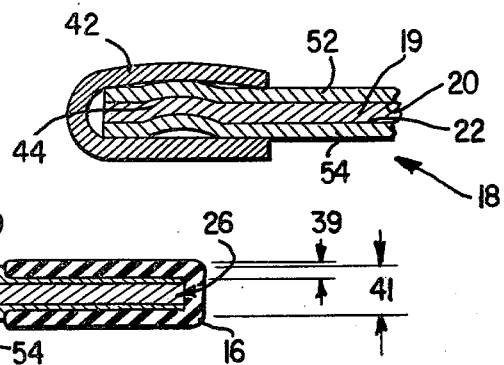
FIG. 3 is an enlarged, fragmentary, cross-sectional view of the gasket assembly of FIG. 1 taken along line 3—3 of FIG. 1.

While this invention is susceptible of embodiment in many different forms, there is shown in the drawings, and will herein be described in detail, a specific embodiment with the understanding that the present disclosure is to be considered as an exemplification of the principles of the invention and is not intended to limit the invention to the specific embodiment illustrated.

Figure 4:
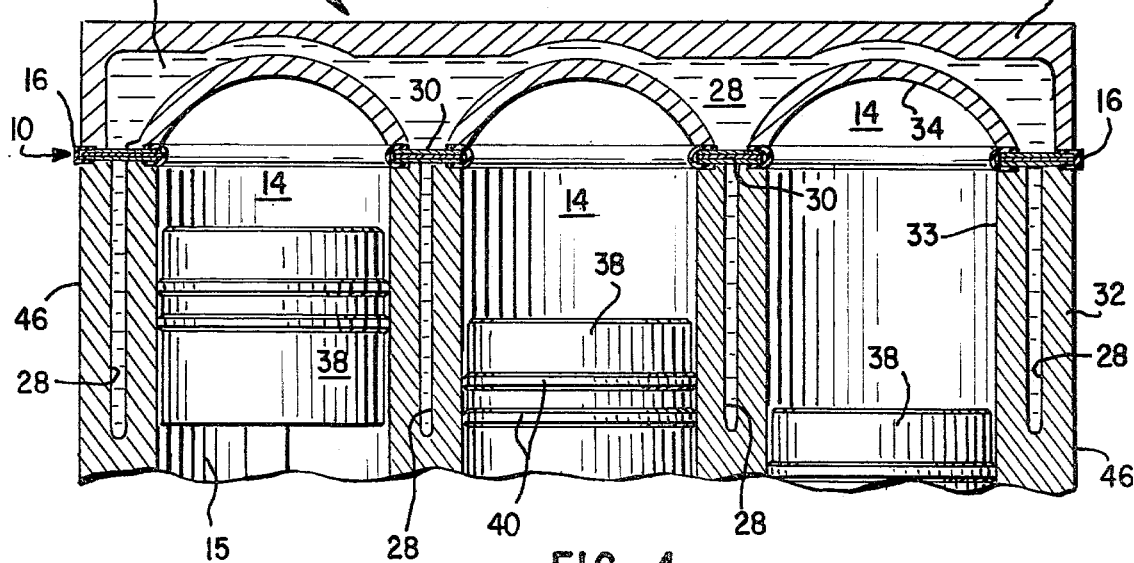
FIG. 4 is a partial, cross-sectional, elevational view of a marine engine incorporating the gasket assembly shown in FIG. 1.

Referring now to the drawings, a wicking-resistant engine gasket assembly 10 is especially configured and constructed to be used in a schematically illustrated marine internal combustion engine 12 (see FIG. 4) having a plurality of combustion chambers 14 arranged along a line L defining the longitudinal axis of the engine. Engine 12 includes an engine block 32 and a cylinder head 36. The cavities 34 in the cylinder head 36 and the bores 33 formed in the engine block 32 define the combustion chambers 14. Each combustion chamber 14 contains a piston 38 suitably joined to the crankshaft (not shown). Each combustion chamber 14 is sealed from the crank case 15 by one or more piston rings 40 carried by the piston 38. The gasket assembly 10 is juxtaposed between the engine block 32 and cylinder head 36. Cooling water passageways 28 are formed around the combustion chambers 14 in both the engine block 32 and the cylinder head 36.

The wicking-resistant gasket assembly 10 includes a main body portion 18 having an elongated generally flat, metal core or base 19. The base 19 has a top or first generally planar surface 20 and a bottom or second generally planar parallel surface 22.

On each side of the base 19, a layer such as a sheet of a composite compressible gasket facing material is applied. The "facings" or facing sheets 52, 54 are typically fiber reinforced and are attached mechanically and/or adhesively to the two planar surfaces 20, 22 of the metal gasket base 19. The most frequently used facings 52, 54 incorporate asbestos or glass fibers and utilize nitrile, neoprene or polyacrylate elastomers to provide the self-sustaining facings. In the embodiment illustrated, the facings 52, 54 and the base 19 have a total thickness of 0.035 inch, although this may vary with the application. The facing sheets 52, 54 generally resist degradation by oils and coolants, retain torque, minimize extrusion and exhibit heat resistance.

After the facing sheets 52, 54 are joined to the gasket base 19, the main gasket body 18 is die cut or blanked out (such as with a stamping machine, punch press or other suitable equipment) to provide, in the illustrated embodiment combustion openings 24, a plurality of bolt holes 29, and a plurality of fluid flow passageways 30 for cooling water. Other shapes and thicknesses may be used depending upon the configurations and requirements of the engines with which the gasket assembly 10 is to be used.

The gasket assembly 10 further comprises an armor ring 42 adjacent the periphery of the combustion openings 24 to protect the main body portion 18 of the gasket assembly from the heat and pressure in the combustion chambers 14 and to seal the interface between the engine block 32 and cylinder head 36. The thickness and shape of the armor 42 is a function of a number of factors known to those skilled in the art. In the embodiment illustrated, the gasket base 19 is embossed adjacent the combustion openings 24 to form an embossment 44 which is embraced and ensheathed by the armor 42. By varying the height and width of the embossment 44, a wide range of load compression properties can be accomodated.

In accordance with this invention the adverse effects of fluid wicking through the gasket assembly 10 are minimized. Fluid, such as seawater used to cool the engine 12, passes through the openings 30 in the facing layers 52, 54 bridging the cooling water passageways 28 in the cylinder head 36 and engine block 32. The primary criteria for a material to be impervious to a fluid is to achieve sufficient density to eliminate voids which might allow capillary flow of the fluid through its interior. This requirement may be met by compressing the material to fill the voids or by partially or completely filling the voids during fabrication by means of binders and fillers. However, to maintain impermeability for a long time, the constituents of the gasket material must be able to resist degradation and disintegration due to chemical attack and temperature at the sealing sites. This is a relatively difficult task to accomplish as one approaches closer to the interior of the engine where temperatures and pressures are at their highest. Indeed, where there is leakage, in some cases steam is generated making sealing even more difficult.

In accordance with the present invention, sealing against the escape of fluid leaking from the passageways and wicking through the facing layers occurs at the perimeter of the gasket assembly. The possibility of some internal leakage or wicking is of no concern, but in contradistinction, the exterior surfaces 46 of the engine 12 are not usually designed to accomodate the deposited salt and minerals which accumulate on engines using gaskets that permit wicking through the peripheral edge of the gasket. Such salts and minerals present appearance and corrosion problems.

In accordance with this invention, the periphery 26 of the gasket assembly 10 is enveloped in a continuous bead 16 of an impervious elastomeric material or rubber to seal the exterior surfaces 46 of the engine 12 from the fluids, particularly brackish cooling water, leaking along or wicking through the facing sheets 52, 54 of the gasket assembly. Specifically, after the application of the facing sheets 52, 54 to the surfaces 20, 22 of the base 19, a U-shaped (in cross-section) layer of rubber, such as neoprene, nitrile, polyacrylate or silicone rubber, is applied to the peripheral edges 26 of the main body portion 18 of the gasket assembly 10 to form a bead 16. Preferably, the bead 16 is formed in situ on the peripheral edges 26 of the main body portion 18 of the gasket assembly 10 to insure that it is continuous and formed in one piece. The bead 16 can also be applied to the peripheral edge 26 of the main body portion 18 of the gasket assembly 10 by laying a flexible, performed, U-shaped channel of rubber around the perimeter of the main body portion and then sealing together the two ends.

Figure 2A:
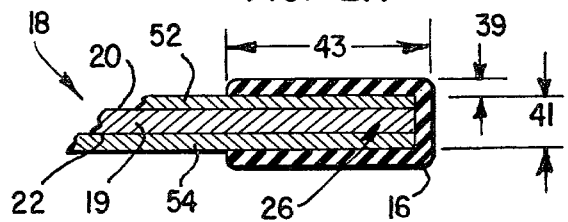
FIG. 2A is an enlarged, fragmentary, cross-sectional view of the gasket assembly of FIG. 1 taken along line 2—2 of FIG. 1.
Figure 2B:
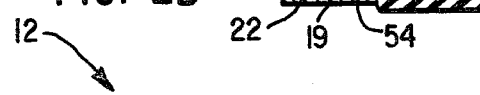
FIG. 2B is an enlarged, fragmentary, cross-sectional view of an alternate embodiment of the gasket assembly illustrated in FIG. 1 taken along line 2—2 of FIG. 1.

If the bead 16 is too thick such that it excessively overlaps the edge 26 of the gasket assembly 10, the sealing effect between the engine block 32 and cylinder head 36 produced by the main body portion 18 of the gasket assembly may be effected. On the other hand, if the thickness 39 of the bead 16 is too thin it may tend to abrade away by virtue of the vibration between the cylinder head 36 and the engine block 32. One method that may be used to correct or adjust the thickness 39 of the bead 16 relative to the thickness 41 of the main body portion 18 of the gasket assembly 10 is to compress or "coin" a portion of the peripheral free edge 26 of one or both of the facing sheets 52, 54. This is illustrated in FIG. 2B. This method allows a relatively thick bead 16 to be used without affecting the compression characteristics of the gasket assembly. A bead 16 having a thickness 39 about one-third the thickness 41 of the main body portion 18 of the gasket assembly 10 has been found to function satisfactorily in terms of serving as a supplementary seal at the periphery and as a barrier to the passage of liquid from the main body portion of the gasket to the exterior.

The bead 16 and the facing sheets 52, 54 may be applied to an uncured or cured state. Conventionally, the facing sheets 52, 54 are applied to base 19 in an uncured state and are laminated under heat and pressure. Preferably, the bead 16 is applied to the main body portion 18 of the gasket assembly 10 after the facing sheets 52, 54 are applied to the base 19 and both are cured at the same time (such as at 350° F. for approximately one minute.)

In summary, the peripheral bead 16 together with the engine block 32 and cylinder head 36 forms a barrier preventing the wicking of liquids from the inside of the engine 12. The bead 16 thereby substantially eliminates the degradation in appearance and the corrosion of the external surfaces 46 of the engine 12 which have occurred in the past due to brackish cooling water wicking through the facing sheets 52, 56. These results are achieved without otherwise adversely affecting the performance of the main body portion 18 of gasket assembly 10.

Although but two embodiments of the invention have been illustrated and discussed in detail, it is to be understood that the various modifications and substitutions may be made by those skilled in the art without departing from the novel spirit and scope of the invention.

What is claimed is as follows:

1. A wicking-resistant gasket assembly adapted to be positioned between an engine having an engine block and a closely confronting cylinder head, said engine defining at least one combustion chamber, said gasket assembly comprising:

a main body portion including a gasket base defining first and second expansive surfaces and an expansive composite porous facing layer on each of said surfaces, each of said base and said layers being relatively thin and having a peripheral edge portion defining the periphery of said main body portion, said main body portion defining at least one combustion opening and at least one fluid flow aperture;

and an elastomeric seal member encapsulating said periphery and said edge portions and extending inwardly therefrom a distance sufficient to provide an impervious barrier at the edges of said facing layers and at expansive surfaces of said facing layers adjacent said edges, thereby preventing the wicking of fluid through said composite facing layer beyond the edge portions of said facing layers when said gasket assembly is installed in said engine and fluid under pressure passes through said fluid flow aperture.

2. A wicking-resistant gasket assembly adapted to be positioned between the confronting surfaces of an engine block and a cylinder head, said engine block and cylinder head defining at least one combustion chamber, comprising:

a flat laminated main body portion including a core layer of metal and co-extensive facing layers of porous, fiberous gasketing material covering both sides of the metal layer, each facing layer having a peripheral edge portion at the peripheral margin of said main body portion, said main body portion defining at least one combustion opening; and an elastomeric seal member at said peripheral margin and carried by said main body portion and extending laterally inward from the peripheral margin thereof a distance sufficient to cover and overlap the edge portions and expansive surfaces of said facing layers adjacent thereto and to provide a continuous bead of elastomeric material emcompassing the outer edges of said gasket assembly, said bead being adapted to sealingly engage said engine block and cylinder head when said gasket assembly is installed, whereby said seal member provides an impervious liquid barrier at the periphery of said gasket assembly when said gasket assembly is installed so that wicking of fluid through said co-extensive facing layers of porous, fibrous gasketing material and through the periphery of said gasket assembly is prevented.

3. The wicking-resistant gasket assembly defined in claim 1, further including:

armor at the periphery of said combustion openings for protecting the edge of said combustion opening from the heat of combustion and adapted to be compressed between said cylinder head and said engine block.

4. The wicking-resistant gasket assembly defined in claim 2, further including:

armor at the periphery of said combustion openings for protecting the edge of said combustion opening from the heat of combustion and adapted to be compressed between said cylinder head and said engine block.

5. The wicking-resistant gasket assembly defined in claim 1, wherein the peripheral edge portion of at least one of said facing layers has been compressed to define a perimeter encircling portion of said main body portion having a thickness less than that of the remainder of said at least one layer, said seal member encompassing said perimeter encircling portion whereby the thickness of said gasket assembly is relatively uniform throughout.

6. The wicking-resistant gasket assembly defined in claim 2, wherein the peripheral edge portion of at least one of said facing layers has been compressed to define a perimeter encircling portion of said main body portion having a thickness less than that of the remainder of said at least one layer, said seal member encompassing said perimeter encircling portion whereby the thickness of said gasket assembly is relatively uniform throughout.

7. The wicking-resistant gasket assembly defined in claim 3 or 4 further comprising:

means for affecting the load compression properties of the gasket assembly comprising embossment of said main body portion at the periphery of said combustion openings.

* * * * *